United States Patent
Nicholas et al.

(10) Patent No.: US 9,879,728 B1
(45) Date of Patent: Jan. 30, 2018

(54) CENTER BEARING ASSEMBLY WITH SHEAR MEMBER

(71) Applicant: Ford Global Technologies, LLC, Dearborn, MI (US)

(72) Inventors: Chris Peter Nicholas, Milford, MI (US); Brian John Brown, Clinton Township, MI (US); Duane Allan Lewis, Westland, MI (US); Bradley W. Doner, Northville, MI (US); Edward Steven Lanivich, Brownstown, MI (US); Rakesh Sharma, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/219,556

(22) Filed: Jul. 26, 2016

(51) Int. Cl.
*F16C 35/06* (2006.01)
*F16C 19/06* (2006.01)
*F16C 3/02* (2006.01)

(52) U.S. Cl.
CPC .............. *F16C 35/06* (2013.01); *F16C 3/02* (2013.01); *F16C 19/06* (2013.01); *F16C 2240/12* (2013.01); *F16C 2326/06* (2013.01)

(58) Field of Classification Search
CPC ........ F16C 2326/06; F16C 35/06; F16C 3/02; F16C 2240/12; B60K 17/24; F16D 9/00; F16D 9/06; F16D 9/08
See application file for complete search history.

(56) References Cited

U.S. PATENT DOCUMENTS

| | | | | |
|---|---|---|---|---|
| 3,047,345 A | * | 7/1962 | Burton | B60K 17/24 180/381 |
| 6,079,897 A | * | 6/2000 | Schweitzer | F16B 21/183 285/4 |
| 6,276,837 B1 | * | 8/2001 | Iwano | F16C 27/066 384/488 |
| 6,422,947 B1 | * | 7/2002 | Kelly | B60K 17/24 464/178 |
| 6,435,299 B1 | | 8/2002 | Miller | |
| 6,766,877 B2 | | 7/2004 | Blumke et al. | |
| 6,883,967 B2 | | 4/2005 | Robb et al. | |
| 7,097,363 B2 | | 8/2006 | Ostrander et al. | |
| 7,896,554 B2 | * | 3/2011 | Yamada | F16C 19/06 180/381 |
| 7,922,394 B2 | * | 4/2011 | Hirakawa | B60K 17/22 180/381 |
| 8,132,640 B2 | | 3/2012 | Heitkamp et al. | |
| 8,888,376 B2 | * | 11/2014 | Hatogai | F16C 3/02 384/480 |
| 8,961,024 B2 | * | 2/2015 | Ikeda | F16C 27/066 384/536 |
| 9,303,695 B2 | * | 4/2016 | Choi | B62D 1/192 |
| 9,511,664 B2 | * | 12/2016 | Mori | B60K 17/24 |
| 2011/0133413 A1 | * | 6/2011 | Kato | F16C 33/76 277/565 |

* cited by examiner

*Primary Examiner* — Alan B Waits
(74) *Attorney, Agent, or Firm* — James Dottavio; Brooks Kushman, P.C.

(57) ABSTRACT

A center-bearing assembly includes an annular housing having a circumferential wall with a lip extending radially inward and includes a flange outboard of the circumferential wall. A roller bearing is sized to encircle a vehicle driveshaft and is disposed within the housing between the lip and the flange. An annular retainer is connected to the flange and includes an annular notch configured to shear in response to impact to the driveshaft allowing the bearing to release from the housing.

17 Claims, 2 Drawing Sheets

CENTER BEARING ASSEMBLY WITH SHEAR MEMBER

TECHNICAL FIELD

The present disclosure relates to a center-bearing assembly having a shear member configured to release the bearing from the assembly in response to a sufficient impact to the driveshaft.

BACKGROUND

Motor vehicles typically include an engine for propelling the vehicle. The engine is connected to a transmission that modifies the engine output to a desired speed ratio. A driveshaft (also known as a propshaft) is driveably connected between an output of the transmission and a differential to transmit torque to the driven wheels. The driveshaft is secured to a chassis of the vehicle by a bracket assembly. The bracket assembly includes a bearing having an inner race fixed to the driveshaft and an outer race fixed to the bracket.

SUMMARY

According to one embodiment, a center-bearing assembly includes an annular housing having a circumferential wall with a lip extending radially inward and includes a flange outboard of the circumferential wall. A roller bearing is sized to encircle a vehicle driveshaft and is disposed within the housing between the lip and the flange. An annular retainer is connected to the flange and includes an annular notch configured to shear in response to impact to the driveshaft allowing the bearing to release from the housing.

According to another embodiment, a center-bearing assembly for a driveshaft of a vehicle includes an annular housing supported within a bracket assembly connected to a frame of the vehicle. The housing has a circumferential wall with a lip extending radially inward from a first end and has a flange with a portion extending radially outward from a second end. A roller bearing is concentric with the housing and has an outer race disposed within the housing such that the bearing is located between the lip and the flange and such that a first side of the bearing is disposed against the lip. The bearing further has an inner race fixed to the driveshaft. A shear ring is connected to the flange and includes a designed fracture portion defining a breakaway tab disposed against a second side of the bearing. The fracture portion is configured to, in response to an impact having a magnitude exceeding a shear strength of the fracture portion, shear at the fracture portion causing the breakaway tab to separate allowing the bearing to slide out of the housing.

According to yet another embodiment, a driveshaft assembly includes a driveshaft, and a bearing having an inner race fixed to the driveshaft, an outer race, and bearing elements disposed between the races. A bearing support is mountable to a vehicle. A bearing can is mounted in the support and defines an opening that receives the bearing therein. A shear ring is connected to the can, engages the bearing, and including an annular notch configured to shear and release the bearing from the can.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
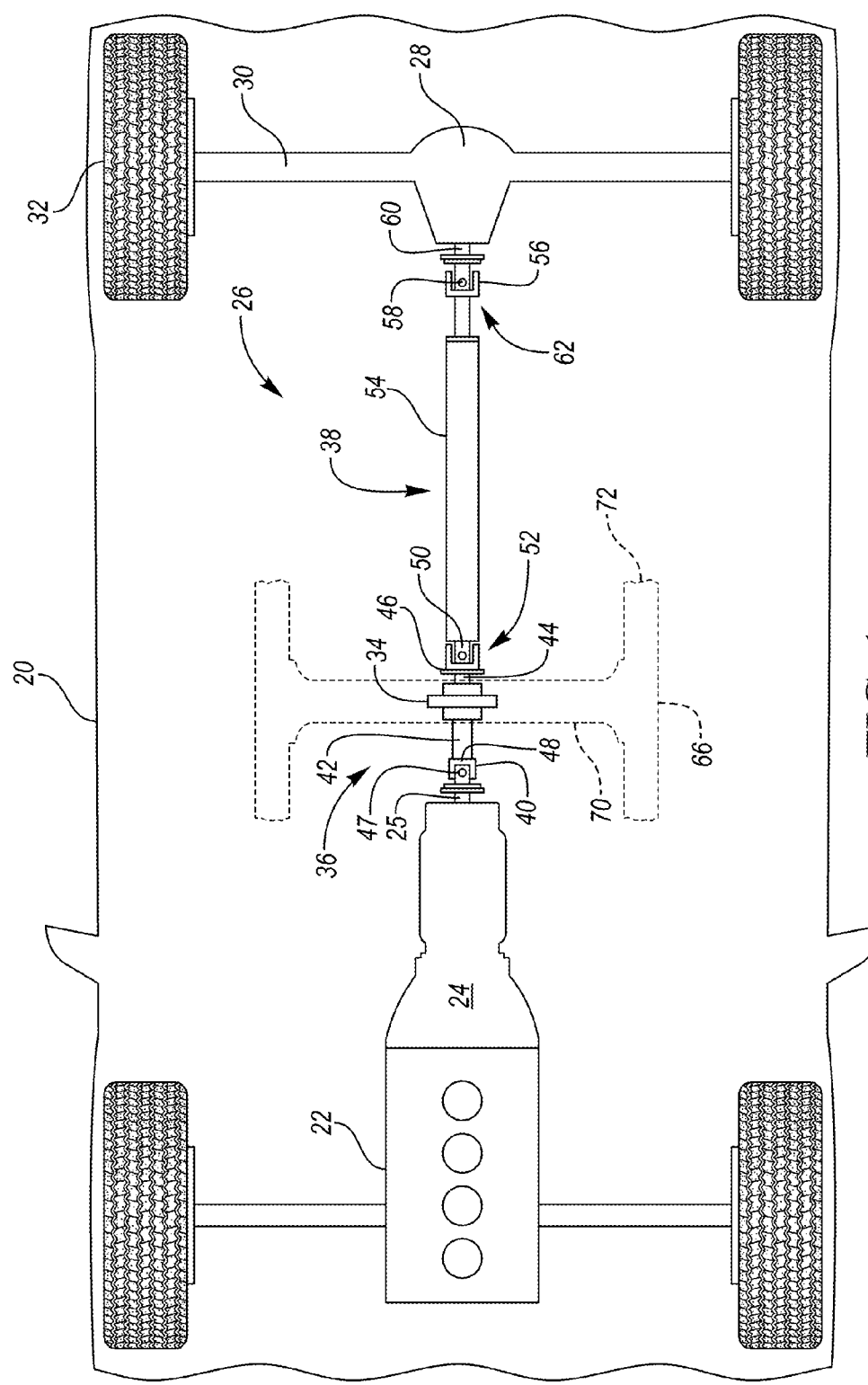
FIG. 1 is a schematic diagram of an example vehicle having a driveshaft assembly.
Figure 2:
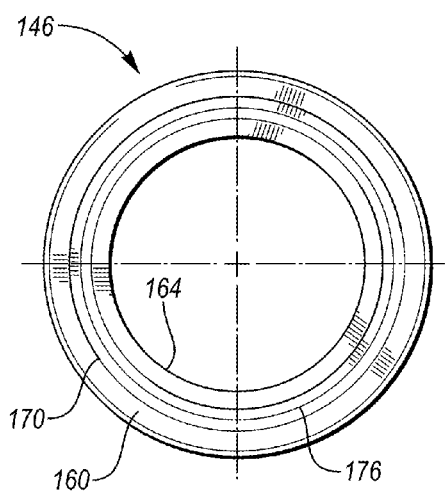
FIG. 2 is a front view of an annular shear ring of a center-bearing assembly.
Figure 3:
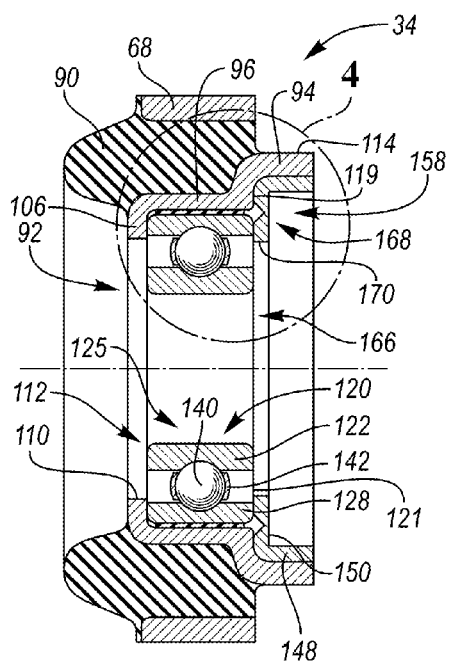
FIG. 3 is side view, in cross section, of a center-bearing assembly.
Figure 4:
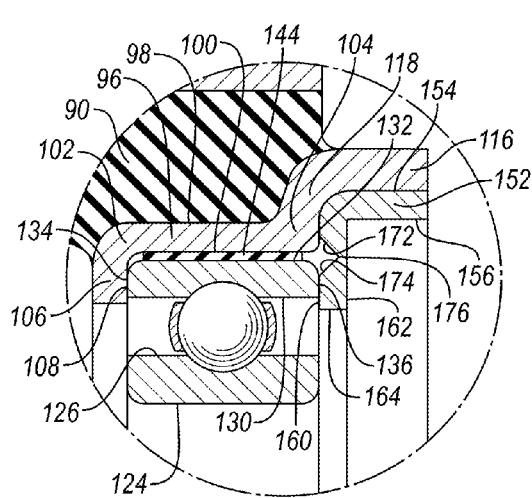
FIG. 4 is a magnified side view of the center-bearing assembly of FIG. 3.
Figure 5:
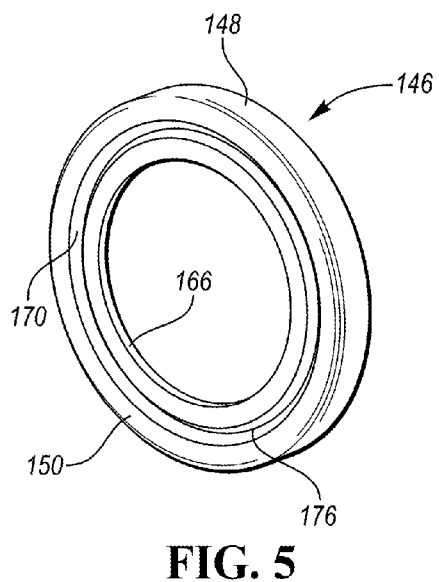
FIG. 5 is a perspective view of the annular shear ring of FIG. 2.

Referring to FIG. 1, a vehicle 20 (such as a front engine, rear-wheel drive vehicle or a four-wheel drive vehicle) may include an engine 22 and a transmission 24. The transmission 24 includes an output shaft 25 that is coupled to a front end of a driveshaft 26. The rear end of the driveshaft 26 is coupled to the rear differential 28 or similar device. The driveshaft 26 may be coupled via universal joints (U-joints), constant-velocity joints (CV Joints), or the like. The driveshaft 26 transmits power from the transmission 24 to a final drive disposed within the rear differential 28. The final drive is driveably connected to the rear wheels 32 via one or more rear axles 30. If the vehicle is four-wheel drive, the front end of the driveshaft 26 is coupled to the transfer case. The driveshaft 26 may include a center-bearing assembly 34 that support the driveshaft to the vehicle chassis. This will be explained in more detail below.

In one embodiment, the driveshaft 26 is a multi-segment driveshaft that includes a front shaft 36 and a rear shaft 38. The front shaft includes a yoke 40 that couples to a yoke 47 of the transmission output shaft 25 at a forward U-joint 48. The yoke 40 includes a flange that is connected to a tube 42 via welding or other means known in the art. The tube 42 extends rearwardly from the yoke 40 and terminates at a flange of a yolk shaft 44. The shaft 44 extends rearwardly and terminates at a rear yoke 46. The rear yoke 46 is coupled to a front yoke 50 of the rear shaft 38 at an intermediate U-joint 52. The front yoke 50 is connected to a tube 54 that extends rearwardly to a rear yoke 56. The rear yoke 56 couples to a yoke 58 of the differential input shaft 60 at a rear U-joint 62.

Due to their length, driveshafts typically require at least one support structure to suspend the driveshaft beneath an underside of the vehicle 20. The driveshaft 26 includes a center-bearing assembly 34 that mounts the driveshaft 26 to a chassis 66 of the vehicle 20. For example, the assembly 34 includes a bracket that bolts to a cross member 70 that extends between the frame rails 72.

FIGS. 2 through 5 illustrate different views of a center-bearing assembly according to one embodiment. Referring to these figures, the center-bearing assembly 34 may include a bracket 68 for connecting the assembly 34 to the vehicle chassis 66. A bushing (or resilient member) 90 is disposed within the bracket 68. The bushing 90 defines a bearing receiving portion 92 that receives the bearing therein. The bushing may be formed of an elastomeric material such as rubber. The bushing absorbs vibrations from the driveshaft to prevent them from traveling to the chassis.

The bearing assembly 34 also includes an annular housing (can) 94 that is generally in the shape of a tube. The can 94 may include a circumferential wall 96 having an outer surface 98, an inner surface 100, a first end 102, and a second end 104. The can 94 is received within the bushing 90 such that the outer surface 98 is disposed against an inner surface of the bushing. The can 94 may also include a lip 106 extending radially inward from the first end 102. The lip 106 includes a bearing-engaging surface 108 and an inboard wall 110 that defines a circular hole 112. A flange 114 of the annular housing 94 generally extends radially outward from the second end 104. The flange 114 may include a retainer-engaging tab 116 that is substantially concentric with the circumferential wall 96. The diameter of the tab 116 is larger than the diameter of the circumferential wall 96. The tab 116 is connected to the circumferential wall 96 by a radially extending wall 118. The wall 118 includes a retainer-facing surface 119 that is coplanar with an end surface 121 of the bearing 120.

A roller bearing 120 is secured within the annular housing 94. The roller bearing 120 may be any type of roller bearing including a ball bearing, a needle bearing, or other type. The roller bearing 120 supports the driveshaft 26 for rotation within the assembly 34. The bearing 120 may include an inner race 122 having an inner surface 124 and an outer surface 126. The inner surface 124 defines a circular hole 125 that receives the driveshaft 26 therein such that the inner surface 124 engages the outer surface of the driveshaft. In the embodiment illustrated in FIG. 1, the inner race is disposed on the yolk shaft 44. Is to be understood, however, that the center bearing assembly 34 may be disposed on a different portion of the driveshaft.

The bearing 120 also includes an outer race 128 that is concentric with, and circumscribes, the inner race 122. The outer race 128 has an inner surface 130, an outer surface 132, a first end surface 134, and a second and surface 136. The end surfaces extend between the inner and outer surfaces. A plurality of roller elements 140, such as metal balls or cylinders, are disposed between the inner and outer races 122, 128. The roller elements 140 rollably engage between the races allowing for low-friction, relative movement between the races. The roller elements 140 may be retained in a cage 142. Grease may be disposed within the cavity between the races and seals (not shown) are provided to retain the grease and prevent contaminants from entering into the cavity.

The bearing 120 is disposed within the annular housing 94 such that the outer surface 132 of the outer race 128 is disposed against (or near) the inner surface 100 of the circumferential wall 96 and the first end surface 134 is disposed against the bearing-engaging surface 108 of the lip 106. The annular housing 94 may include a friction surface 144 disposed on the inner surface 100 and sandwiched between the circumferential wall 96 and the outer race 128. The friction surface 144 increases the friction coefficient between the roller bearing 120 and the annular housing 94 to resist the bearing from sliding relative to the housing 94. The friction surface may be made of an elastomeric material such as rubber. The friction surface may be omitted in some embodiments.

The lip 106 prevents the roller bearing 120 from sliding axially to the left, however, additional retaining means is required to prevent axial movement of the bearing 120 to the right. As such, the bearing assembly 34 includes an annular retainer 146. The retainer 146 may be a shear ring having a cylindrical portion 148 and a retaining portion 150 that extends radially inward from the cylindrical portion. The cylindrical portion 148 may include a circumferential wall 152 having an outboard surface 154 and, an inboard surface 156. A circular hole 158 is defined by the inboard surface 156. The retaining portion 150 may include a front face 160, a back face 162, and an inboard surface 164 that defines a circular hole 166. The retainer 146 is disposed in the flange portion 114 of the annular housing 94. In one embodiment, the outboard surface 154 of the circumferential wall 152 is press fit to the retainer-engaging tab 116 of the flange. The front face 160 of the retaining portion 150 is disposed against the second end surface 136 of the outer race 128 to retain the roller bearing 120 within the annular housing 94.

During an impact, one or more vehicle structures cooperate to absorb energy in order to reduce impact forces on the occupants of the vehicle. The driveshaft may be utilized to absorb some of these forces. During a frontal impact, forces travel through the bumper, into the engine, and subsequently into the driveshaft. In order to absorb this energy, the driveshaft may be designed to deform (i.e., crush) or displace rearwardly. The center-bearing assembly not only provides vertical support but also provides fore-and-aft support. In order for the driveshaft to displaced rearwardly in response to an impact force, the bearing assembly must either detach form the frame, or have one or more bearing components separate from the bracket or bushing. Designs relying on bracket failure are difficult to tune and the assembly process injects uncertainty into the shear strength. As such, it may be preferable for the bearing to separate from the bushing or from itself.

In the illustrated embodiment, the center-bearing assembly 34 is designed such that the roller bearing 120 separates from the annular housing 94 in response to an impact of sufficient magnitude. The annular housing 94 is disposed on the vehicle such that the lip 106 faces forwardly and the flange 114 faces rearwardly. Thus, the shear ring 146 and the friction surface 144 (if included) are the only components that resist reward movement of the driveshaft 26 relative to the annular housing. The shear ring 146 may include a fracture portion (or weakened portion) having a reduced cross-sectional area, and thus a reduced shear strength. In one embodiment, the reduced cross-sectional area is created by providing a notch 170 into the front face 160. In other embodiments, the fracture portion may be formed by apertures.

The notch 170 may be V-shaped and include first and second angular walls 172, 174 intersecting at a valley 176. The notch 170 may be circular and extend around the entire shear ring 146. A breakaway tab 168 of the retaining portion 150 is defined between the inboard surface 164 and the valley 176. The notch 170 may be located on the front face 160 such that the valley 176 is radially aligned (or nearly aligned) with the interface between the outer race 128 and the annular housing 94. This placement of the notch disposes only the breakaway tab 168 against the roller bearing 120. In response to a shear force of sufficient magnitude, the breakaway tab 168 separates from the main body of the shear ring 146 allowing the roller bearing 120 to slide out of the annular housing 94 if the friction force of the friction surface 144 is overcome.

The shear strength of the retainer 146 at the notch 170 may be less than the shear strength of the press fit to ensure that the bearing assembly 34 fails at the notch 170. For example, the shear strength of the retainer 146 at the notch 170 may be between 20 to 80 kilonewtons (kN). In order to achieve this shear strength, the depth of the notch may be between 10 to 50 percent of the thickness of the retaining portion 150.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A center-bearing assembly comprising:
an annular housing including a circumferential wall having a lip extending radially inward and a flange outboard of the circumferential wall, wherein the flange includes a retainer-engaging tab and a radially extending wall extending between the circumferential wall and the tab;
a roller bearing sized to encircle a vehicle driveshaft and disposed within the housing between the lip and flange such that an end surface of the bearing is coplanar with a retainer-facing surface of the radially extending wall; and
an annular retainer connected to the retainer-engaging tab of the flange and including an annular notch configured to shear in response to impact to the driveshaft allowing the bearing to release from the housing.

2. The center-bearing assembly of claim 1 further comprising a friction coating disposed on an inner surface of the circumferential wall to increase a coefficient of friction between the housing and the roller bearing.

3. The center-bearing assembly of claim 1, wherein the notch is recessed into a radially extending wall of the retainer and a breakaway portion of the radially extending wall is defined between the notch and an inboard surface of the radially extending wall, and wherein the breakaway portion is the only portion of the radially extending wall in contact with the bearing.

4. The center-bearing assembly of claim 1, wherein the retainer is press fit to the tab, and a strength of the press fit exceeds a shear strength of the notch.

5. The center-bearing assembly of claim 1, wherein the tab and the circumferential wall are concentric.

6. The center-bearing assembly of claim 1, wherein the retainer has a shear strength between 20 to 80 kilonewtons at the notch.

7. A driveshaft assembly comprising:
a driveshaft;
a bearing can mountable to a vehicle and defining an inner surface having a friction coating thereon;
a bearing having an inner race fixed to the driveshaft, an outer race seated on the friction coating, and bearing elements disposed between the races; and
a shear ring connected to the can, engaging the bearing, and including an annular notch configured to shear and release the bearing from the can.

8. The driveshaft assembly of claim 7, wherein the can further includes a circumferential wall and a flange outboard of the circumferential wall, and wherein the shear ring is connected to the flange.

9. The driveshaft assembly of claim 8, wherein the can further includes a lip extending radially inward from the circumferential wall on a side of the bearing opposite the flange.

10. The driveshaft assembly of claim 7, wherein the driveshaft is configured to driveably connect between a transmission and a differential.

11. A center-bearing assembly for a driveshaft of a vehicle, the assembly comprising:
an annular housing supported within a bracket assembly that is connectable to the vehicle, the housing including a circumferential wall having a lip extending radially inward from a first end, a radially extending wall projecting radially outward from a second end, and a retainer-engaging tab extending axially from an outer end of the radially extending wall;
a roller bearing concentric with the housing and including an outer race disposed within the housing such that the bearing is located between the lip and the radially extending wall, a first side of the bearing is disposed against the lip, and a second side of the bearing is substantially coplanar with an outer surface of the radially extending wall, wherein the bearing further includes an inner race fixed to the driveshaft; and
a shear ring connected to the retainer-engaging tab and including a designed fracture portion defining a breakaway tab disposed against the second side of the bearing, wherein the fracture portion is configured to, in response to an impact having a magnitude exceeding a shear strength of the fracture portion, shear at the fracture portion causing the breakaway tab to separate which allows the bearing to slide out of the housing.

12. The center-bearing assembly of claim 11, wherein the fracture portion includes an annular notch.

13. The center-bearing assembly of claim 12, wherein the breakaway tab includes a thickness (T), and wherein a depth of the notch is between 0.1*T and 0.5*T.

14. The center-bearing assembly of claim 11 further comprising a friction coating disposed on an inner surface of the circumferential wall to increase a coefficient of friction between the annular housing and the outer race.

15. The center-bearing assembly of claim 14, wherein the friction coating is rubber.

16. The center-bearing assembly of claim 11, wherein the fracture portion has a shear strength between 20 to 80 kilonewtons.

17. The center-bearing assembly of claim 11, wherein the shear ring is press fit to the flange, and wherein a strength of the press fit exceeds the shear strength of the fracture portion.

* * * * *